US008001036B2

(12) United States Patent
Brown et al.

(10) Patent No.: US 8,001,036 B2
(45) Date of Patent: Aug. 16, 2011

(54) SYSTEM FOR MATCHING ORDERS FOR FUTURES CONTRACTS WHICH FACILITATE ELECTRONIC TRADING OF OVER THE COUNTER FUTURES CONTRACTS

(75) Inventors: Simon G. Brown, London (GB); Jamie Macleod, Queensway (GI); Kevin Noles, Gloucestershire (GB)

(73) Assignee: Altex-ATS Ltd, London (GB)

( * ) Notice: Subject to any disclaimer, the term of this patent is extended or adjusted under 35 U.S.C. 154(b) by 141 days.

(21) Appl. No.: 11/442,858

(22) Filed: May 30, 2006

(65) Prior Publication Data
US 2007/0294160 A1 Dec. 20, 2007

(51) Int. Cl.
G06Q 40/00 (2006.01)
(52) U.S. Cl. .......................................... 705/37; 705/35
(58) Field of Classification Search ............... 705/35–37
See application file for complete search history.

(56) References Cited

U.S. PATENT DOCUMENTS

| 4,903,201 A * | 2/1990 | Wagner ........................... 705/37 |
| 4,980,826 A * | 12/1990 | Wagner ........................... 705/37 |
| 5,873,071 A * | 2/1999 | Ferstenberg et al. ....... 705/36 R |
| 5,963,923 A * | 10/1999 | Garber ........................... 705/37 |
| 6,016,483 A * | 1/2000 | Rickard et al. .............. 705/36 R |
| 6,278,982 B1 * | 8/2001 | Korhammer et al. ....... 705/37 |
| 6,618,707 B1 * | 9/2003 | Gary ........................... 705/36 R |
| 7,035,819 B1 * | 4/2006 | Gianakouros et al. .......... 705/37 |
| 7,162,447 B1 * | 1/2007 | Cushing .......................... 705/37 |
| 7,430,533 B1 * | 9/2008 | Cushing .......................... 705/37 |
| 7,552,083 B2 * | 6/2009 | Carone et al. .................... 705/37 |
| 7,653,588 B2 * | 1/2010 | Tilly et al. ........................ 705/37 |
| 7,716,121 B2 * | 5/2010 | Walsky et al. ................... 705/37 |
| 7,729,978 B2 * | 6/2010 | Mintz et al. ..................... 705/37 |
| 7,752,116 B2 * | 7/2010 | Ascher et al. .................... 705/37 |
| 7,765,137 B1 * | 7/2010 | Adcock et al. .................. 705/35 |
| 7,797,226 B2 * | 9/2010 | Ram et al. ....................... 705/37 |
| 7,840,477 B2 * | 11/2010 | Claus et al. ..................... 705/37 |
| 7,856,392 B1 * | 12/2010 | Fishbain et al. ............. 705/36 R |
| 7,856,393 B1 * | 12/2010 | Fishbain et al. ............. 705/36 R |
| 7,865,422 B2 * | 1/2011 | Lutnick et al. .................. 705/37 |
| 7,873,544 B2 * | 1/2011 | Adcock et al. .................. 705/35 |
| 7,873,561 B1 * | 1/2011 | Adcock et al. .................. 705/37 |
| 2002/0188548 A1 * | 12/2002 | Bunda ............................. 705/37 |

(Continued)

FOREIGN PATENT DOCUMENTS

JP 20022150036 A 5/2002

(Continued)

OTHER PUBLICATIONS

Search Report.

(Continued)

*Primary Examiner* — Narayanswamy Subramanian
(74) *Attorney, Agent, or Firm* — Dickstein Shapiro LLP

(57) ABSTRACT

An electronic trading system and method is disclosed for matching orders for various asset classes including futures contracts and the subsequent settlement and clearance of such contracts. The electronic trading system is configured to be connected to one or more electronic exchanges and is also configured to interface with the existing infrastructure of the front office software of a trading firm, broker or dealer to provide the best fill for traders by enabling electronic trades to be executed both on the exchange and over the counter. In one embodiment of the invention, a local order book is established thereby establishing an independent pool of liquidity of the asset class of interest.

20 Claims, 10 Drawing Sheets

U.S. PATENT DOCUMENTS

| | | |
|---|---|---|
| 2003/0004853 A1* | 1/2003 | Ram et al. .................. 705/37 |
| 2004/0059666 A1* | 3/2004 | Waelbroeck et al. ........... 705/37 |
| 2004/0088242 A1* | 5/2004 | Ascher et al. ................ 705/37 |
| 2004/0210511 A1* | 10/2004 | Waelbroeck et al. ........... 705/37 |
| 2004/0215538 A1* | 10/2004 | Smith et al. .................. 705/35 |
| 2004/0225593 A1 | 11/2004 | Frankel et al. |
| 2004/0236637 A1 | 11/2004 | Tatge et al. |
| 2005/0228738 A1 | 10/2005 | Harris |
| 2005/0234790 A1 | 10/2005 | Newport |
| 2005/0234809 A1 | 10/2005 | Criner |
| 2006/0031156 A1* | 2/2006 | Noviello et al. ............... 705/37 |
| 2006/0031157 A1* | 2/2006 | Gianakouros et al. .......... 705/37 |
| 2006/0143111 A1* | 6/2006 | Mylet ........................ 705/37 |
| 2006/0149659 A1* | 7/2006 | Carone et al. ................ 705/37 |
| 2006/0167788 A1* | 7/2006 | Tilly et al. ................... 705/37 |
| 2006/0167789 A1* | 7/2006 | Tilly et al. ................... 705/37 |
| 2006/0218071 A1* | 9/2006 | Sweeting ..................... 705/37 |
| 2006/0253371 A1* | 11/2006 | Rutt et al. ................... 705/37 |
| 2006/0277137 A1* | 12/2006 | Claus et al. .................. 705/37 |
| 2007/0124230 A1* | 5/2007 | Sofianos ...................... 705/37 |
| 2007/0150401 A1* | 6/2007 | Brucato et al. ................ 705/37 |
| 2007/0250433 A1* | 10/2007 | Bhat et al. ................... 705/37 |
| 2008/0140559 A1* | 6/2008 | Ram et al. ................... 705/37 |
| 2010/0082473 A1* | 4/2010 | Smith et al. .................. 705/37 |
| 2010/0145874 A1* | 6/2010 | Janowski ..................... 705/36 R |
| 2010/0332379 A1* | 12/2010 | Ram et al. ................... 705/37 |

FOREIGN PATENT DOCUMENTS

| | | |
|---|---|---|
| JP | 2004220442 A | 8/2004 |
| JP | 2005032112 A | 2/2005 |
| JP | 2005174158 A | 6/2005 |
| WO | WO 98/21667 | 5/1998 |
| WO | WO 00/63814 | 10/2000 |
| WO | WO 01/55932 A1 | 8/2001 |
| WO | WO 02/06921 A3 | 1/2002 |
| WO | WO 02/07498 A2 | 1/2002 |
| WO | WO 02/33627 A2 | 4/2002 |
| WO | WO 02/47006 A1 | 6/2002 |
| WO | WO 03/012598 A2 | 2/2003 |
| WO | WO 2005/043273 A2 | 5/2005 |
| WO | WO 2005/043437 A2 | 5/2005 |
| WO | WO 2005/048063 A2 | 5/2005 |
| WO | WO 2005/067571 A2 | 7/2005 |
| WO | WO 2006/039815 | 4/2006 |

OTHER PUBLICATIONS

Search Report (EP 07 25 2207).

* cited by examiner

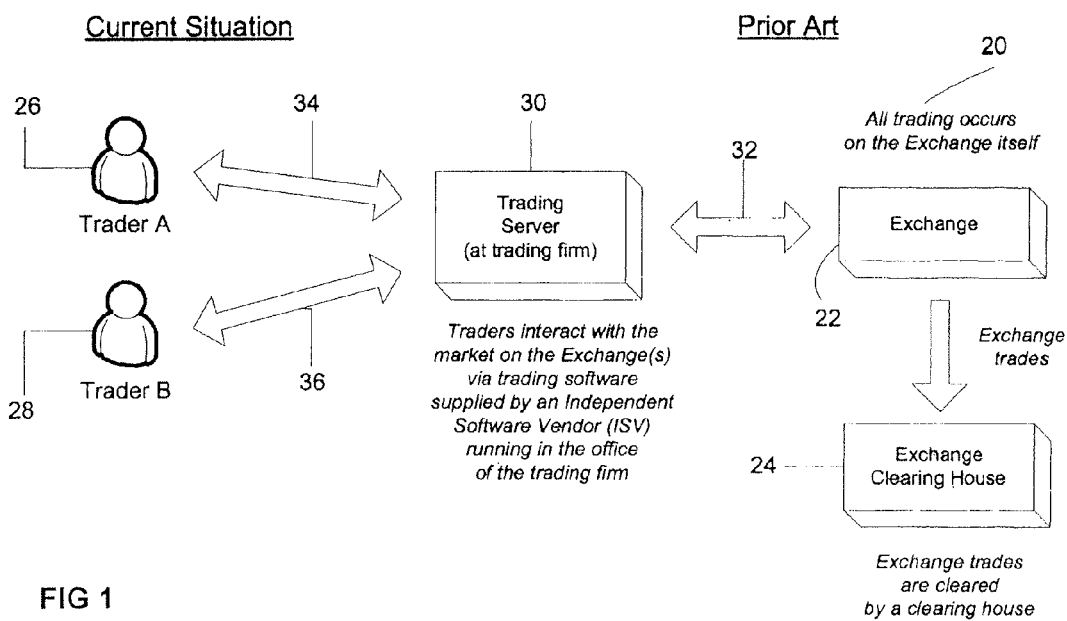
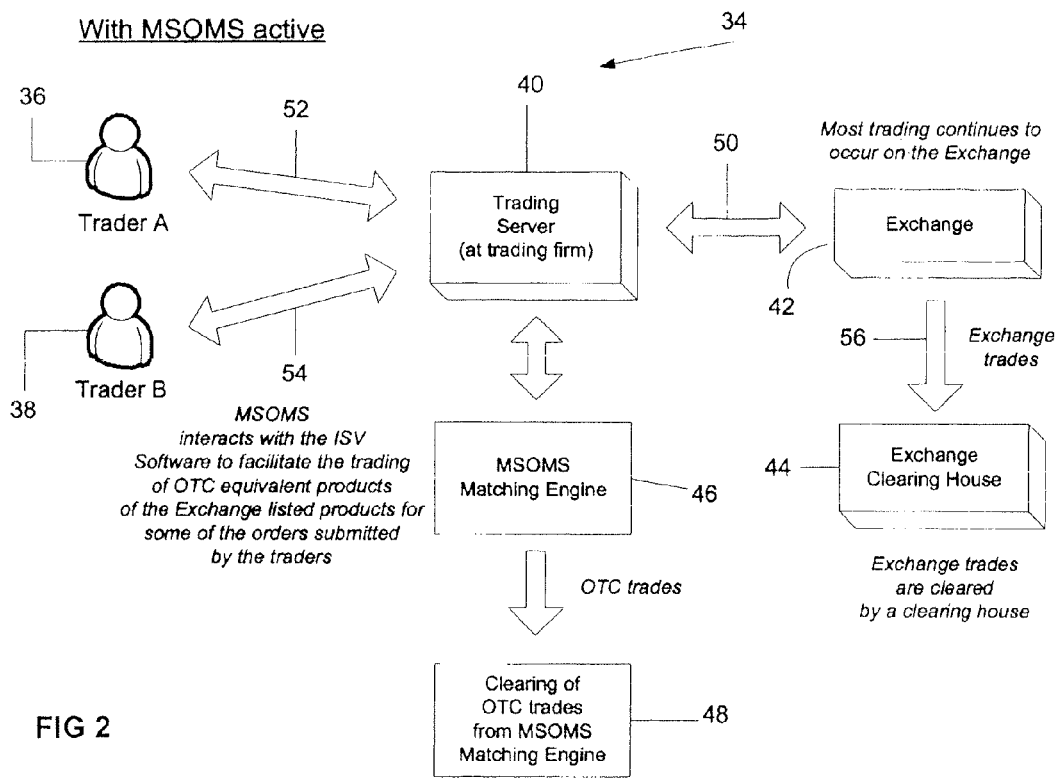

SYSTEM FOR MATCHING ORDERS FOR FUTURES CONTRACTS WHICH FACILITATE ELECTRONIC TRADING OF OVER THE COUNTER FUTURES CONTRACTS

COMPUTER APPENDIX

This application includes a Computer Listing Appendix on compact disc, hereby incorporated by reference.

BACKGROUND OF THE INVENTION

1. Field of the Invention

The present invention relates to a method and a system for electronic trading of various asset classes including futures contracts and options on futures contracts (collectively "futures contracts") which is configured to be connected to one or more electronic exchanges and integrated into the existing front office software of a broker or dealer to enable both exchange trades and over the counter (OTC) trades while providing the best fill for traders. One embodiment of the invention includes a local order book for an independent pool of liquidity for the OTC products.

2. Description of the Prior Art

Electronic futures exchanges for trading futures contracts electronically are known in the art. Examples of such exchanges are disclosed in U.S. Pat. Nos. 4,903,201; and 4,980,826. Such futures exchanges are also disclosed in various international patent applications: WO 98/21667(PCT/US97/20287); WO 02/06921(PCT/US01/22534); WO 02/33627(PCT/US01/32275) and WO 03/012598(PCT/US02/24560); WO 02/47006 (PCT/US01/47464); and WO 02/07498 (PCT/KR00/0106). In general, these systems have been developed to supplement if not replace so called "open outcry" futures trading exchanges, such as the Chicago Board of Trade (CBOT), Chicago Mercantile Exchange (CME) and the New York Mercantile Exchange (NYMEX). In such open outcry exchanges, floor traders stand in a pit and execute trades verbally. While such open outcry futures trading exchanges are still in use, electronic futures trading exchanges allow traders to access the market electronically and greatly facilitate trading in futures contracts.

Both International Patent Application Publication Nos. WO 02/07498 and WO 02/47006 disclose electronic systems for processing bids and offers for futures trades. In particular, International Patent Publication No. WO 02/47006 discloses a system for linking bids and offers and presenting the linked bid and offer to an electronic futures exchange to minimize any adverse affects the linked bids and offers may have on each other if presented at different times. International Patent Publication No. WO 02/47006. International Patent Application Publication No. WO 02/07498 relates to an interface between broker/dealers and customers for responding to requests for quotations (RFQ) from customers in which a customer RFQ is sent out to multiple broker/dealers and the resulting quotes are returned to the customer. In these cases there exists a single liquidity pool for the futures contracts and all of the trading is done on the exchange and thus subject to the rules of the exchange. With the single liquidity pool established by the exchange, orders are not necessarily filled at the best possible price. In addition, with all trades going through the exchange, the traffic at the exchange in completing trades could slow down the response time of completing the trades and thus could impact the market price of the futures contracts. Thus there is a need for a system to fill orders for futures contracts at better pricing and which alleviates electronic traffic on the exchange.

SUMMARY OF THE INVENTION

Briefly, the present invention relates to an electronic trading system and method for matching orders for various asset classes including futures contracts and the subsequent settlement and clearance of such contracts. The electronic trading system is configured to be connected to one or more electronic exchanges and is also configured to be integrated into the existing infrastructure of the front office software of a broker or dealer to provide the best fill for traders while at the same time enabling electronic trades to be executed both on the exchange and over the counter. In one embodiment of the invention, a local order book is established thereby establishing an independent pool of liquidity of the asset class of interest.

DESCRIPTION OF THE DRAWING

These and other advantages of the present invention will be readily understood with reference to the following drawing and the following specification and attached drawing wherein:

FIG. 1 is a block diagram of a known electronic futures contracts trading system.

FIG. 2 is a simplified block diagram of the electronic trading system in accordance with the present invention.

DETAILED DESCRIPTION

Figure 3A:
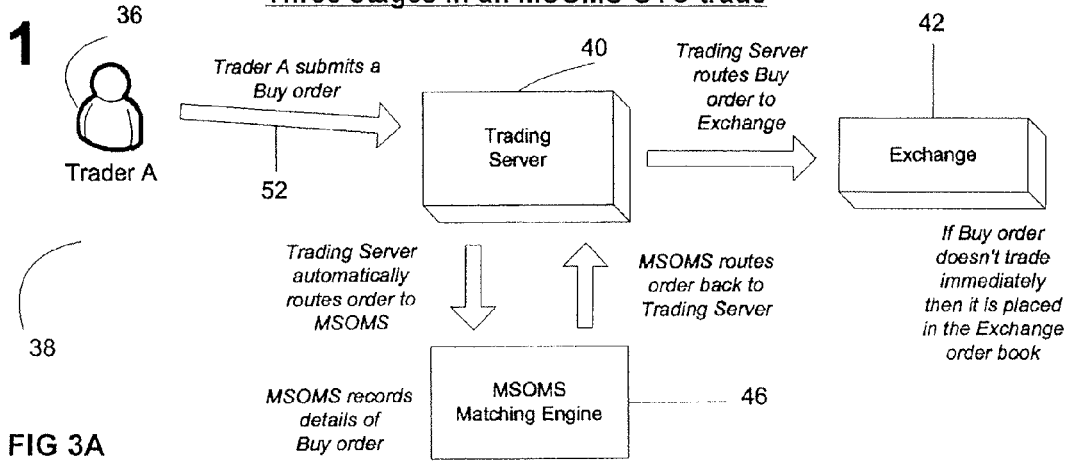
FIGS. 3A-3C are simplified block diagrams illustrating the various stages of a trade in accordance with the electronic trading system in accordance with the present invention.

The present invention relates to an electronic trading system and method for matching orders for various asset classes including futures contracts and the subsequent settlement and clearance of such contracts. The electronic trading system is configured to be indirectly connected to one or more electronic exchanges and is also integrated into the existing infrastructure of the front office software of a broker or dealer to provide the best fill for traders while enabling electronic trades to be executed both on the exchange and over the counter. In one embodiment of the invention, a local order book is established thereby establishing an independent pool of liquidity of the asset class of interest.

Existing Trading System

FIG. 1 is a simplified block diagram of an existing architecture for electronic trading of futures contracts, generally identified with the reference numeral 20. With such architecture, all trades occur on the electronic exchange 22 and are cleared by an exchange clearing house 24. In particular, traders 26, 28 place orders for futures contracts electronically by way of trading server 30 accessible by traders in a trading firm to place buy and sell orders for futures contracts or other asset classes directly with an electronic exchange. The trading server 30 is normally connected to the exchange 22 by way of a communication link 32 and is known to run commercially available "front office software", such as Realtime Trading Desktop (RTD), available from RTS Realtime Systems AG (www.rtsgroup.net) to connect to the electronic exchange 22. The traders 26 and 28 are then able to place orders with the exchange 22 by way of public or private communication links 34, 36. The orders from the traders 26, 28 are placed byway of the "front office" software. The front office software logs the order and transmits the order to the electronic exchange 22. The exchange 22 acknowledges the receipt of the order to the front office software by way of the communication link 32. The order acknowledgement is passed back to the traders 26, 28 by way of the communication links 34, 36 respectively. After the buy/sell orders have been matched, clearing of the trades is accomplished by a clearing house 24, associated with the exchange 22 and the traders 26, 28 are notified in the manner discussed above. In the existing system, all trades are accomplished at the exchange 24.

Exemplary Electronic Trading Architecture

FIG. 2 is a simplified block diagram of an electronic trading system in accordance with the present invention and generally identified with the reference numeral 34. Similar to the embodiment illustrated in FIG. 1, the electronic trading system 34 allows traders 36, 38 to place orders by way of front office software, for example, as discussed above, running on a trading server 40 over one or more communication links 52, 54. These orders are routed to the electronic exchange 42 by way of a communication link 50. Once the orders are matched, the trades are forwarded to an exchange clearing house 44 by way of a communication link 56, where they are cleared.

In accordance with an important aspect of the invention, the system 34 allows electronic trading in virtually real time of over the counter (OTC) products. As used herein, OTC products refer to any product other than the corresponding or competing Exchange product, such as ICAP OTC (www.i-cap.com) equivalent products, The electronic trading system 34 includes "back office" software which a matching engine 46. The back office software interacts with the front office software, resident on the trading server 40, to facilitate electronic trading of OTC products in addition to exchange trades while providing the best order fill for trades. Electronic trading of OTC products is discussed in more detail in connection with FIGS. 3A-3C.

Each trade is cleared by a clearing house associated with its market venue. In particular, exchange trades are cleared by a clearing house 44 associated with the exchange 42. OTC trades are cleared by an OTC clearing house 48. For example, ICAP (www.icap.com), an electronic inter-dealer for OTC products may be used for clearing the electronic OTC trades.

Figure 3B:
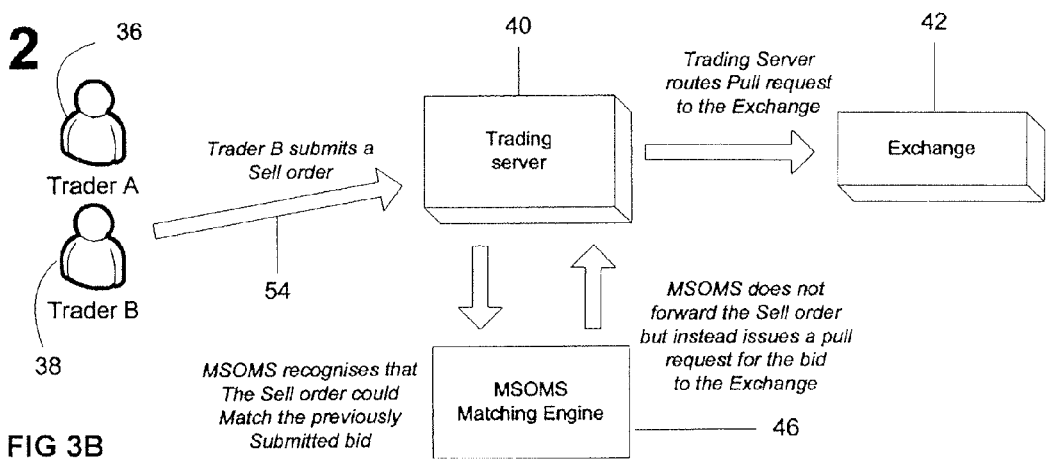
Figure 3C:
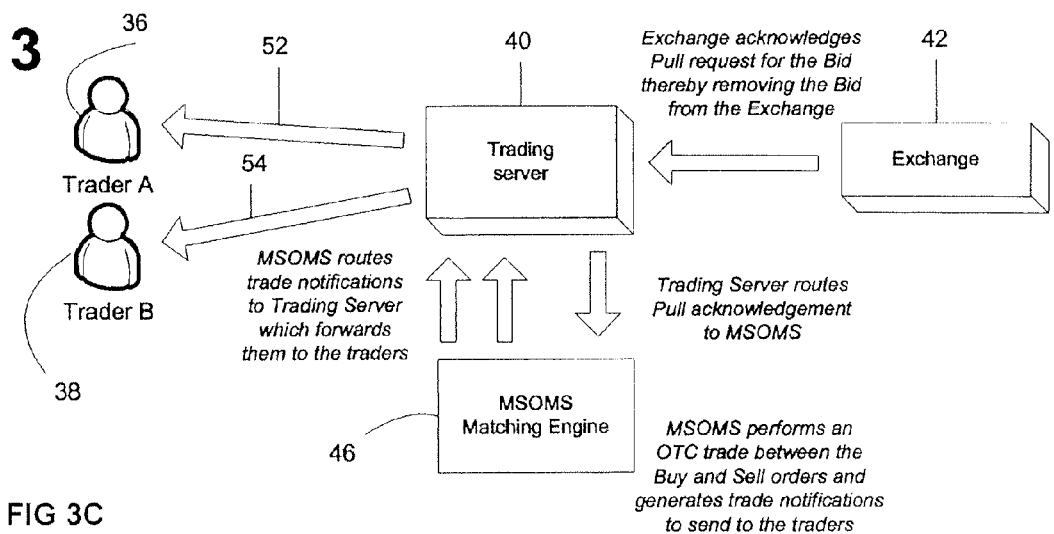

As mentioned above, the electronic trading system 34 enables electronic trading by way of an electronic exchange as well as electronic OTC trades. The process is illustrated in FIGS. 3A-3C. Referring first to FIG. 3A, assume trader A 36 submits a buy order for a particular product to a trading server 40 by way of the communication link 52. The buy order that s received by the front office software is translated by the back office software to a protocol compatible with the matching engine 46. The buy order is then routed to the matching engine 46, which records the details of the buy order. After the details of the buy order are recorded, the matching engine 46 re-routes the buy order to the front office software at the trading server 40, once the protocol is translated by the back office software. In particular, the back office software changes the protocol of the buy order to be compatible with the protocol of the front office software. The front office software then routes the buy order to the electronic exchange 42. If the buy order does not trade immediately on the electronic exchange 42, it is placed in the exchange order book.

Next assume that trader 38 submits a sell order for the same product that is received by the trading server 40 by way of the communication link 54. As mentioned above, this sell order is received by the front office software and is converted by the back office software and automatically routed to the matching engine 46. Assuming that the sell order matches the previous buy order, the sell order is not re-routed back to the trading server 40 and the electronic exchange 42. Rather, in this case, the matching engine 46 issues a pull request for the previously submitted buy order to the back office software. The back office software converts the pull request to a protocol compatible with the front office software and automatically transmits the pull request to the electronic exchange 42.

The exchange 42 removes the sell order from the exchange and its order book and acknowledges the pull request (i.e. cancel order request) back to the trading server 40, by way of the front office software, as illustrated in FIG. 3C. The acknowledgement of the pull request is received by the back office software is converted by the back office software and automatically routed to the matching engine 46. The matching engine 46 then performs an OTC trade between the buy and sell orders and generates trade notifications which are sent to the traders 36, 38. The trade is then cleared by the OTC clearing house 48 (FIG. 2).

In addition to the functionality of the electronic trading system 34 described above in connection with FIGS. 3A-3C, the electronic trading system 34 in accordance with the present invention may be configured with the following functionality, identified as "use cases", as listed in the table and described in detail below.

| Ref | Name | Description |
| --- | --- | --- |
| UC1 | initialize system | Initializes connections to one or more exchanges and downloads standing data from each |
| UC2 | Trader connect | Trader connects to an exchange |
| UC3 | Trader disconnect | Trader disconnects from an exchange |
| UC4 | Trader order | Trader submits order |

-continued

| Ref | Name | Description |
|---|---|---|
| UC5 | Trader revision | Trader revises a previously submitted order |
| UC6 | Trader pull | Trader pulls a previously submitted order |
| UC7 | Trader message | Trader generated message of no interest to the system |
| UC8 | Forward to Exchange | Sub use case. The system forwards a Trader request to an exchange |
| UC9 | Forward to Trader | Sub use case. The system forwards an exchange message to one or more Traders |
| UC10 | Exchange fill | The exchange reports a trade fill |
| UC11 | Exchange pull | The exchange reports that an order has been pulled independently of a Trader based request |
| UC12 | Exchange revision | The exchange reports the success or failure of an order revision. |
| UC13 | Exchange state change | The exchange reports on a state change in a tradeable or the market as a whole |
| UC14 | Exchange tradeable data | The exchange reports a change in tradeable market data |
| UC15 | System pull | The system pulls an order from an exchange for use in matching by the system |
| UC16 | System revise | The system revising the volume of an order downwards to allow it to be used in matching by the system. |
| UC17 | System fill | The system informs one or more Traders that they have been filled as a result of a match by the system. |
| UC18 | System match | Matching of order volume within the system application. |
| UC19 | Download standing data | Sub use case. The system downloads standing data for a given exchange |
| UC20 | Add order to exchange order book | Sub use case. The system updates own 'remote order book' to reflect arrival of new order |
| UC21 | Revise remote order book | Sub use case. The system updates own 'exchange order book' to reflect arrival of order revision from Trader or an Exchange fill |
| UC22 | Pull from remote order book | Sub use case. The system updates its own 'exchange order book' to reflect arrival of pull from Trader, an Exchange fill or an Exchange pull |
| UC23 | Update tradeable view | Sub use case. The system updates its own view of the tradeable with the new market data from the exchange. |
| UC24 | Check for matching orders | Sub use case. The system checks whether there are any available matching orders currently being managed by the system. |
| UC25 | Get tradeable view | Sub use case. Provides details of the current state of the tradeable (based on Exchange data feed). |
| UC26 | Tradeable is managed | Sub use case. Determines whether a particular tradeable is being managed by the system. |
| UC27 | Activate tradeable | Allows a whole tradeable, or one side of a tradeable, to be activated during the trading day. |
| UC28 | Deactivate tradeable | Deactivation of a whole tradeable, or one side of a tradeable, during the trading day. |

Use Case Descriptions

UC1 SYSTEM Initialize
Main Success Scenario
1. Loads system configuration and validates requested settings.
2. Initializes services including database access, event logging and monitoring and control interface.
3. Establishes connectivity with each required Exchange and for each invokes Download Standing Data.
4. Validate available tradeable details against requested coverage for system
Extensions
1a. System configuration missing or parameters out of valid ranges
   1. System reports errors and shuts down
2a. One or more services fails to initialize correctly.
   1. System reports errors and shuts down
3a. One or more Exchanges are unavailable
   1. System reports errors
   UC2 Trader Connect
Main Success Scenario
1. Trader requests connection to a specific Exchange
2. Trader specific connection to Exchange is established
3. Details of any existing Good Till Cancel orders are retrieved and for each order if Tradeable is managed then call Add Order to Remote Order Book for each.
Extensions
1a. Logon details supplied by Trader are invalid
1b. Exchange is not accepting connections at this time
1c. Trader is already logged on
   UC3 Trader Disconnect
Main Success Scenario
1. Trader requests to disconnect from a specific Exchange.
2. Request is forwarded to the Exchange concerned.
3. System checks for any orders (including GTC's) currently being managed by the Remote Order Book and calls Pull From Remote Order Book as required.
Extensions
3a. If one or more of the Trader orders are currently being worked by the system then the disconnect from the system will be delayed until all outstanding operations have been completed. Note that the disconnection request has already been sent to the Exchange concerned.

UC4 Trader Order
Main Success Scenario
1. Trader submits order into a tradeable and the tradeable is managed by the system
2. The system calls Check for matching orders and potentially matching orders are found.
3. The current price levels of the tradeable are checked using Get tradeable view.
4. One or more system orders can provide the best possible fill so calls the system pull or the system revise as necessary and stores the newly arrived trader order to await the replies from the Exchange.
Extensions
1a. Tradeable isn't currently being managed by the system so trader order is submitted to Forward to Exchange.
2a. There are no potentially matching orders and so Add order to remote order book is called followed by Forward to Exchange.
4a. Best possible fill is not possible within the system and so Add order to remote order book is called followed by Forward to Exchange.
4b. Only some of the volume of the order can be filled by the system with the result that the excess volume is delayed within the system until internal matching has completed.

UC5 Trader Revision
Main Success Scenario
1. Trader submits an order revision into a tradeable and the Tradeable is managed by the system
2. The system detects that the revision represents a price improvement.
3. The system calls Check for matching orders and potentially matching orders are found.
4. The current price levels of the tradeable are checked using Get tradeable view.
5. Some or all of the potentially matching orders are able to provide the best possible fill and so the system calls system pull or system revise for the incoming order revision to reduce the chances of a fill at the previous price.
6. Calls the system pull or the system revise as necessary for all of the potentially matching orders on a Price/Time basis and stores the newly arrived trader revision to await the replies from the Exchange.
Extensions
1a. Tradeable isn't currently being managed by the system so trader revision is submitted to Forward to Exchange.
1b. Order revision relates to a trigger order which is currently being worked by the system Store revision until the system 46 processing is complete.
2a. No price improvement is involved so call Revise remote order book and then Forward to Exchange.
3a. No potentially matching orders so call Revise remote order book and then Forward to Exchange.
5a. Best possible fill cannot be provided by the system so call Revise remote order book and then Forward to Exchange.

UC6 Trader Pull
Main Success Scenario
1. Trader submits an order pull into a tradeable and the Tradeable is managed by the system
2. The system checks that the pulled order is not the subject of any outstanding system initiated pull or revision requests.
3. The system calls Pull from remote order book and Forward to Exchange.
Extensions
1a. Tradeable isn't currently being managed by the system so trader pull is submitted to Forward to Exchange.
1b. Trader has requested that all active orders should be pulled.

1. Create a list of all orders belonging to this Trader which are known of by the system Including those orders in the Remote Order Book as well as any which are currently being worked by the system.
2. For each of these orders call Pull from remote order book.
3. Mark any identified orders currently being worked by the system for future pulling once outstanding operations are completed.
4. Forward original trader request via Forward to Exchange.

1c. Trader has requested that all active orders in a particular tradeable should be pulled.
1. Create a list of all orders in this tradeable belonging to this Trader which are known of by the system Including those orders in the Remote Order Book as well as any which are currently being worked by the system
2. For each of these orders call Pull from remote order book.
3. Mark any identified orders currently being worked by the system for future pulling once outstanding operations are completed.
4. Forward original trader request via Forward to Exchange.

2a. If the order is the subject of an outstanding revision request (price improvement) then Forward to Exchange to ensure that the order is fully cancelled on the Exchange.
2b. If the order is the subject of an outstanding submission request then ensure that order will not be submitted to the Exchange once any potential the system matching has occurred.

UC7 Trader Message
Main Success Scenario
1. Trader submits a message which is of no interest to the system 46. An example of this would be market data subscription requests.
2. The system 46 calls Forward to Exchange.
Extensions
None UC8 Forward to Exchange
Main Success Scenario
1. The system forwards a request to an Exchange. This could have originated from a Trader or the system itself.
Extensions
None UC9 Forward to Trader
Main Success Scenario
1. The system forwards a message to a Trader. The message could originate from an Exchange or be generated by the system itself, for example a fill which has occurred on the system.
Extensions
None UC10 Exchange Fill
Main Success Scenario
1. A trade fill arrives from an Exchange.
2. Full details of the order are retrieved.
3. Tradeable is managed by the system so calls Revise remote order book.
4. Submits Exchange fill message to Forward to Trader.
Extensions
2a. Trade fill relates to an order which is the subject of an outstanding pull or revision request by the system. Adjust expected volume accordingly. In the case of a outstanding revision request it may be possible to avoid the need to reduce the expected volume if the fill amount can be accommodated within the volume still remaining on the Exchange. Submits Exchange fill message to Forward to Trader.

UC11 Exchange Pull
Main Success Scenario
1. A pull notification arrives from an Exchange.
2. Full details of the order are retrieved.
3. Pull has occurred due to a pull request from the system so call the system match.
Extensions
3a. Pull has occurred as a result of an exchange official pulling an order from the market.
   1. If the Tradeable is managed by the system then call Revise remote order book.
   2. Calls Forward to Trader. Note that the scenario where the Trader pulls the order is covered by Trader pull.

UC12 Exchange Revision
Main Success Scenario
1. A revision notification arrives from the Exchange.
2. Full details of the order are retrieved.
3. Revision has occurred due to a revision request from the system so call the system match.
Extensions
3a. Revision was not triggered by the system so calls Forward to Trader.

UC13 Exchange State Change
Main Success Scenario
1. A state change arrives from the Exchange. Examples could be a market or tradeable opening or closing.
2. The system pdates own state information for the market or tradeable concerned.
3. the system tarts or ceases matching activity if appropriate If the market or tradeable has closed then need to complete outstanding operations on trigger orders but not initiate any new ones.
4. Trader is notified of the state change via Forward to Trader.
Extensions
2a. State change caused by an Exchange system failure. Need to stop the system processing in all affected tradeables and clear the Remote Order Book of any orders. All activities on the system trigger orders need to be cancelled.

UC14 Exchange Tradeable Data
Main Success Scenario
1. Exchange reports a change in market data.
2. Tradeable is managed by the system so calls Update tradeable view.
Extensions
2a. If the system doesn't have a dedicated market feed then may be necessary to call Forward to Trader.

UC15 SYSTEM 46 Pull
Sub use case. This has resulted from a Trader submitting a new order into the system or improving the price of an existing order.
Main Success Scenario
1. Create pull request for the specified order.
2. Forward to Exchange.
Extensions
None.

UC16 SYSTEM Revise
Sub use case. This has resulted from a Trader submitting a new order into the system or improving the price of an existing order. Currently the only supported revise action is a volume reduction for an order.
Main Success Scenario
1. Create volume reduction request for the specified order.
2. Forward to Exchange.
Extensions
None.

UC17 SYSTEM Fill
Sub use case.
Main Success Scenario
1. Determine the number of price levels which have been traded.
2. For the triggering order create a fill message for each price level traded at.
3. Create a single fill message for each of the orders which have been matched against.
4. Send each fill message via Forward to Trader.
Extensions
None.

UC18 SYSTEM Match
Main Success Scenario
1. The Exchange response to an order pull or revision instigated by the system is received.
2. Check that all required responses for the trigger order have now been received by the system.
3. Perform match between the trigger order and the orders which have been pulled or revised.
4. Call the system fill to notify all Traders that a trade has occurred.
Extensions
1a. The full set of required responses for a given trigger order are not received within a defined time period. Proceed with any possible matching.
2a. There are still other requests for pull or revision outstanding at the Exchange. Take no further action until these are received.
3a. One or more requested pull or revision operations have failed at the Exchange. This could be because an order had already been filled at the Exchange by the time the request arrived at the Exchange. In this scenario the Exchange fill will already have been received by the system. Another possibility is that an order has been pulled by an Exchange official before the system generated request is received.
3b. One or more of the pull or revision operations are only partially successful in terms of securing the required volume. The most likely cause of this is trading occurring before the system 46 pull and revision requests arrive at the Exchange. If the Exchange market is trading in a pro-rata fashion then it is more likely that multiple orders will be affected in this way.
3c. Trigger order resulted from a price improvement of an order but the related pull or volume revision is not satisfied by the Exchange. Therefore, as necessary, resubmit or revise any orders associated with this trigger order.
4a. The trigger order still has unmatched volume following this episode of matching. Call Trader order in order to repeat the process for the residual volume.
4b. Triggering order is the subject of an outstanding trader pull request. The system creates a pull status message and calls Forward to Trader. In this scenario the trigger order will never reach the Exchange. If there are any outstanding trader revision requests then these can be ignored.
4c. Triggering order is the subject of one or more trader revision requests.
   1. Apply each revision request in turn to the remaining volume in the trigger order.
   2. For each revision request create a status message and call Forward to Trader.
   3. If the triggering order still has unmatched volume available then call Trader Order in order to repeat the process.

UC19 Download Standing Data
Sub use case.

The system downloads standing data for a given exchange. This needs to be validated and checked against the list of target markets and tradeables supplied to the system during system initialization UC20 Add Order to Remote Order Book
Sub use case.
The system updates own 'remote order book' to reflect arrival of new order. Needs to be cross referenced with any order identifier which is returned by the Exchange following a successful submission or alternatively needs to be removed if the submission has failed for any reason.

UC21 Revise Remote Order Book
Sub use case.
Revises 'remote order book' based on the arrival of a trade fill from the Exchange or as a result of a revision having arrived from the Trader concerned.

UC22 Pull from Remote Order Book
Sub use case.
The system updates own 'remote order book' to reflect arrival of pull from Trader, an Exchange fill or an Exchange pull.

UC23 Update Tradeable View
Sub use case.
The system updates its own view of the tradeable to reflect the new market price and volume data from the Exchange concerned.

UC24 Check for Matching Orders
Sub use case.
Checks whether there are any available potentially matching orders currently being managed by the system within the specific market concerned. The possible matching orders are returned to the caller.

UC25 Get Tradeable View
Sub use case.
Provides a view of the current state of the tradeable specified (for example a particular delivery month within a market) including depth. Based on market price and volume information supplied by the Exchange concerned. May only be necessary to provide details of one side of the tradeable.

UC26 Tradeable is Managed
Sub use case.
Evaluates whether a particular tradeable is being managed by the system. The system 46 may only manage a subset of the delivery months within a particular Exchange market. In addition it may be necessary to only allow trading on one side of a delivery month for a period of time. Such exclusions could be specified within the system configuration data and applied during the system initialization.

UC27 Activate Tradeable
Sub use case.
Needs to be called from a monitoring & control interface during live running of the system. Will need to be able to specify which side of the tradeable is being managed. The need for this capability implies that it will be necessary to monitor the system trade data in real time.

UC28 Deactivate Tradeable
Sub use case.
The functionality of electronic trading system in accordance with the present invention is based upon the following assumptions.

Potentially matching orders are selected on a Price/Time basis irrespective of how the actual exchange market trades, e.g. Pro-rata.

The system needs to guarantee best fill for an incoming 'preferred' order which trades within the system. As a result Exchange market data (best prices and depth) needs to be tracked on a continual basis.

If an order is submitted into the electronic order system 34 and the submission results in pulls and/or revisions being issued by the matching engine 46 for the purpose of matching then the trader cannot cancel or modify the submitted order until after all matching operations by the electronic order system 34 are complete.

Electronic Trading System without Local Electronic Order Book

Figure 4A:
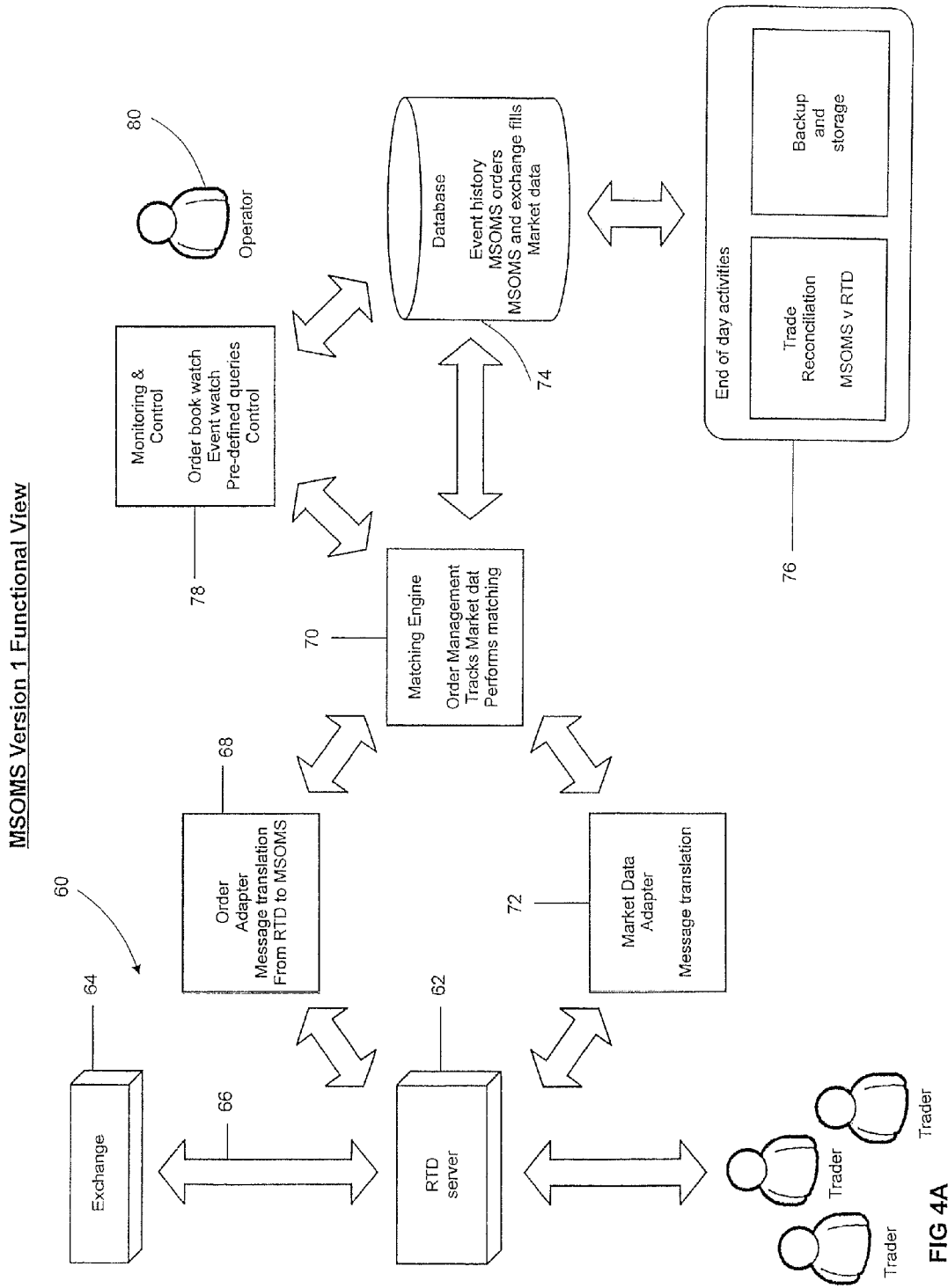
FIGS. 4A and 4B are block diagrams illustrating a first embodiment of the electronic trading system in accordance with the present invention.
Figure 4B:
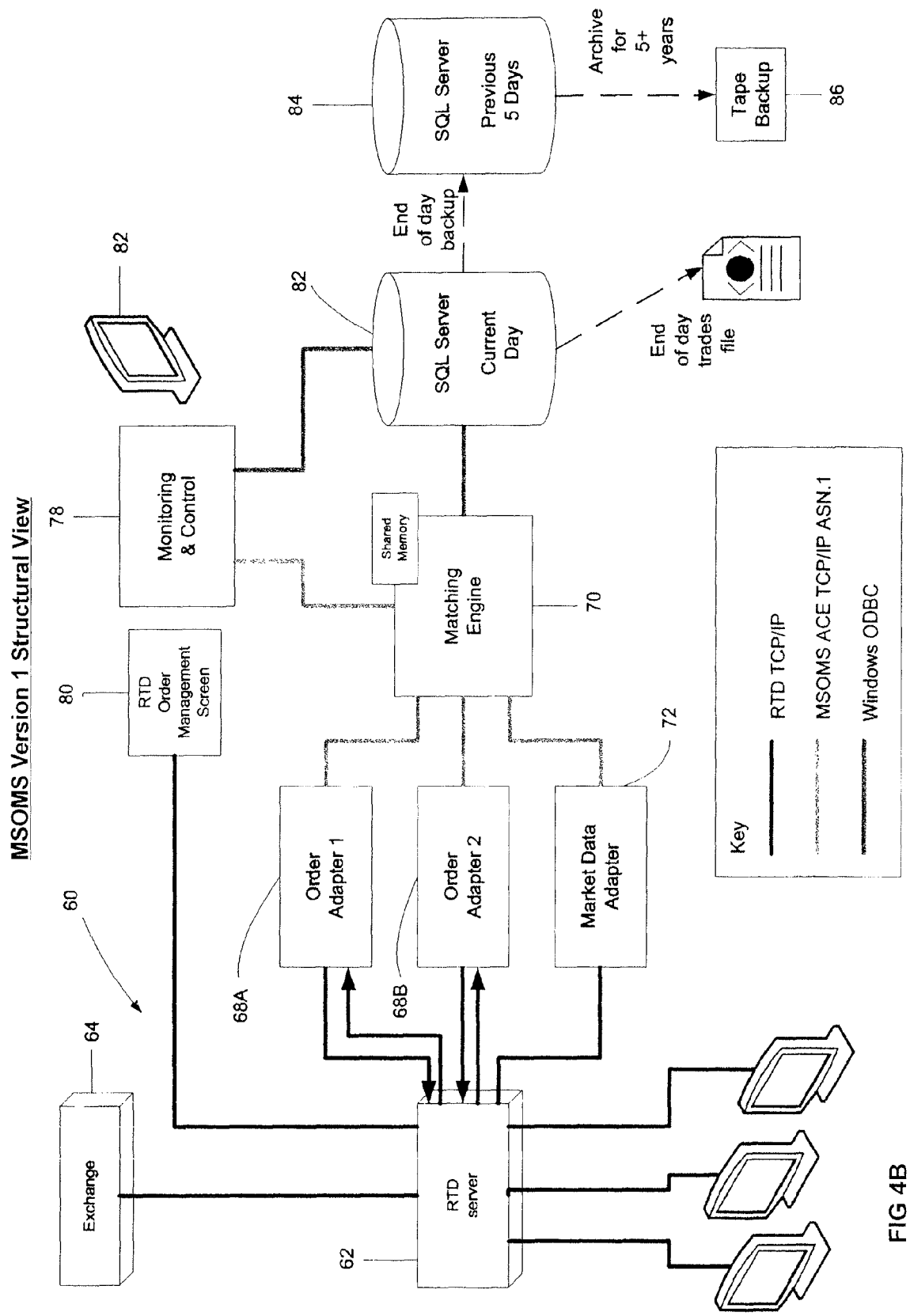
Figure 5A:
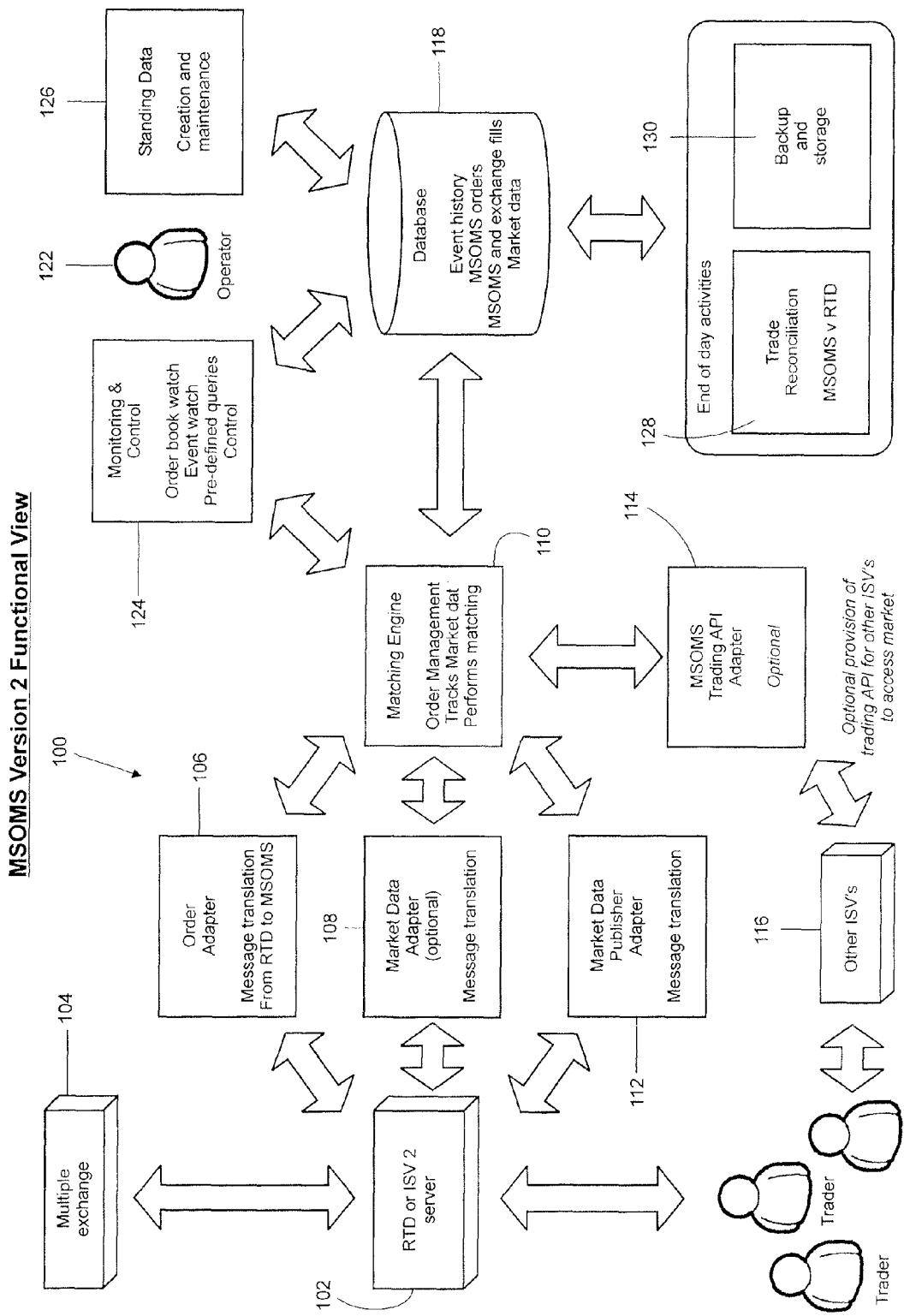
FIGS. 5A and 5B are block diagrams of an alternative embodiment of the electronic trading system illustrated in FIGS. 4A and 4B.
Figure 5B:
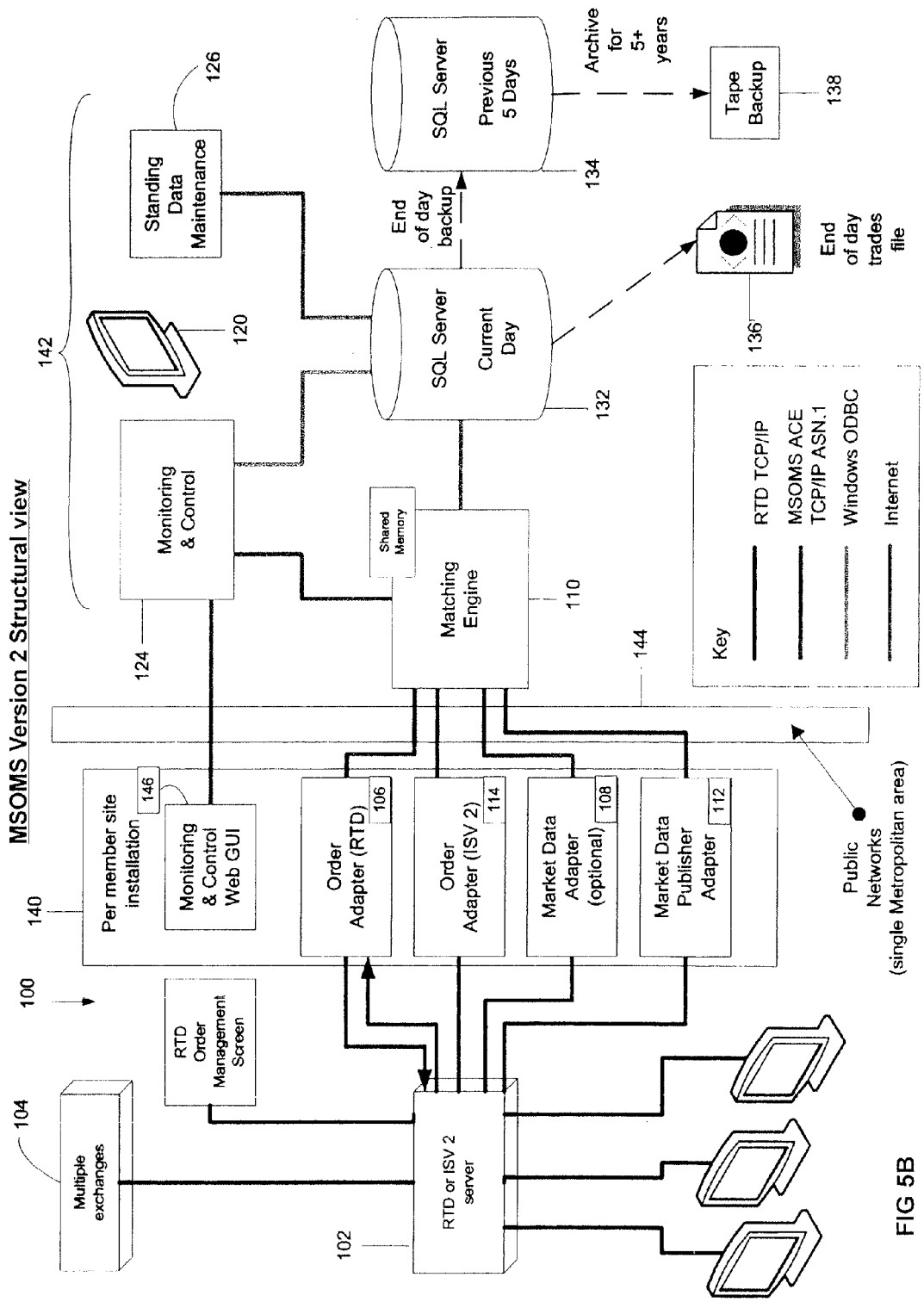

FIGS. 4A-4B illustrate one embodiment of the electronic trading system in accordance with the present invention. The embodiment illustrated in FIGS. 4A-4B does not incorporate an electronic order book. An alternative embodiment illustrated in FIGS. 5A-5B is similar but incorporates a local electronic order book which creates an additional pool of liquidity of the assets being traded.

Referring first to FIGS. 4A and 4B, FIG. 4A illustrates a functional diagram of the electronic trading system in accordance with the present invention. The electronic ordering system is generally identified with the reference numeral 60. The electronic trading system 60 includes a trading server, for example, a server 62 with RTD "front office" software, as discussed above, connected to an electronic exchange over a public or private communication network 66. In accordance with an important aspect of the invention, the electronic trading system 60 includes back office software which is interfaced with the front office software which enables authorized users to monitor the Exchange order book.

In particular, the back office software includes an order adapter 68. The order adapter 68 translates order information received from the traders from the front office protocol to the back office protocol and routes the order information to a matching engine 70. The order adapter 68 is also used to send requests to the exchange 64, for example, a pull request as discussed above.

In order to provide the best fill to the trader, a market data adapter 72 is included as part of the back office software. The market data adapter 72 tracks exchange prices to provide the best fill for trades. In particular, market data from the exchange 64 is received by the front office software at the trading server 62. This market data is converted into a protocol compatible with the back office software in a similar manner as discussed below and is routed to the matching engine 70 and stored in a database 74. The database 74 may reside on the trading server 62 or a separate server (not shown). The database 74 stores market data regarding trades on the exchange 64 as well as market data regarding OTC trades by the electronic trading system 60 (i.e trades which do not involve the exchange 64). This data can be used to ensure the best prices when filling an order, whether at the exchange 64 or OTC. The database 74 may also be used for event history storage and tracking OTC trades.

The back office software may be configured to provide additional functionality. For example, the back office software may be used for initiating end of day activities 76, such as sending OTC trades to an OTC clearing house. For example, the trade data may be sent every five minutes in a batch file to the clearing house, as discussed above. In addition backup and storage on the database 74 may be initiated. The back office software may also be configured to permit monitoring and control from a separate work station or PC. For example, various functions can be provided to a broker or dealer 80. In particular, the back office software may be used to convert Exchange order book information to a protocol compatible with the back office software to enable this information to be stored in the database 74 so that the broker or dealer 80 can monitor exchange order book. The back office software may also be configured to enable event watches as well as enable the broker or dealer to make various queries of the system.

FIG. 4B illustrates a structural illustration of the system 60 illustrated in FIG. 4A. FIG. 4B is similar to FIG. 4A and illustrates a pair of servers 80 and 82, for example SQL servers, for storing and retrieving information from the database 74 (FIG. 4A). In the exemplary embodiment shown, one server 82 may be configured to store the current day's transactions while a second server 84 may be used to store the previous 5 days, for example, transactions. The 5 day server 84 may be archived by a tape or electronic storage system 86. The current day's transactions can be stored in an end of day trades file 88. In addition to the monitoring and control 78, mentioned above, the broker or dealer 80 is normally provided with an order management screen 80 driven by the front office software on a local PC or workstation 82.

Electronic Trading System with Local Electronic Order Book

FIGS. 5A and 5B illustrate an alternate embodiment of the electronic trading system which includes a local electronic order book for tracking OTC orders that do not go through the exchange. By providing a separate local order book for orders that do not go through the exchange, a separate liquidity pool is established for the OTC products not traded through the exchange. As such traders can submit orders which are never submitted to an exchange. In addition with a local order book for orders that are not executed on the exchange, trading times can be allowed to vary and do not necessarily need to coincide with that of the exchange.

Referring to FIG. 5A, a functional block diagram of the electronic trading system is generally identified with the reference numeral 100. The electronic trading system 100 includes a trading server 102. The trading server 102 may be configured with RTD front office software, as discussed above, or other software from an independent software vendor (ISV). In this embodiment, the trading server 102 can be connected to one or more electronic exchanges 104. In order to translate orders from the front office software protocol to the back office protocol, an order adapter 106 is provided, In as much as a local order book is provided in this embodiment, as discussed below, a market data adapter 108 need only be optionally provided on a per site basis. The market data adapter 108 translates market data from the exchange 104 for tracking by a matching engine 110 and storage on a database 118. The market data from the exchange 104 is stored in addition to the market data for OTC trades, which are not executed by the exchange 104. In this way, since the market data for OTC orders will likely be different from exchange orders, orders can be filled OTC at a price equal to or better than the price on the exchange. However an OTC 'only' order does not have a guarantee of best fill—its trading is ultimately constrained by the system price limits rather than the presence of a better price on the exchange. Only 'preferred' orders are guaranteed best fill with respect to exchange prices.

In addition to tracking market data, the matching engine 110 also matches buy and sell orders received at the trading server 102. The matching engine 110 also manages orders and maintains a local order book 112 for orders that do not go through the exchange 104. The local order book is configured as a market data publisher adapter which translates the order book to a protocol compatible with the front office software to provide access to the local order book by way of the trading server 102. The electronic trading system 100 may optionally include a trading adapter to allow other trading systems 116 to access the local order book 112.

Similar to the embodiment illustrated in FIGS. 4A and 4B, the electronic trading system 100 includes a local; PC or workstation 120 (FIG. 5B) for various monitoring and control functions, generally identified with the reference numeral 124, such as, for example. order book watching, event watching. The local PC or workstation 120 also allows an authorized user 122 to query the database 118, The PC or workstation 120 may also be used to create and maintain the database 118, as generally identified with the reference numeral 126.

In this embodiment, the system 100 reconciles trades both on the exchange as well as OTC trades, as generally identified with the reference numeral 128. The system also backs up various data stored on the database 118, as generally identified with the reference numeral 130.

FIG. 5B illustrates an exemplary structural architecture for the electronic trading system 100, illustrated in FIG. 5A. In this embodiment, the matching engine as well as other components of the system 100, such as the servers 132 and 134 for storing current day trades and the previous 5 day's trades, respectively, and the local PC or workstation 120 are located at a central office or location. The various order adapters 106, 114, as well as the local order book 112 and the optional market data adapter 108 may be located at the member sites, as generally identified with the reference numeral 140. The member sites 140 may be connected to the back office system generally identified with the reference numeral 142, by way of a public communication network 144, for example. Each member site 140 may optionally include a graphical user interface (GUI) 146 for accessing the monitoring and control functions 124 at the central office for operator information.

Software

Figure 6:
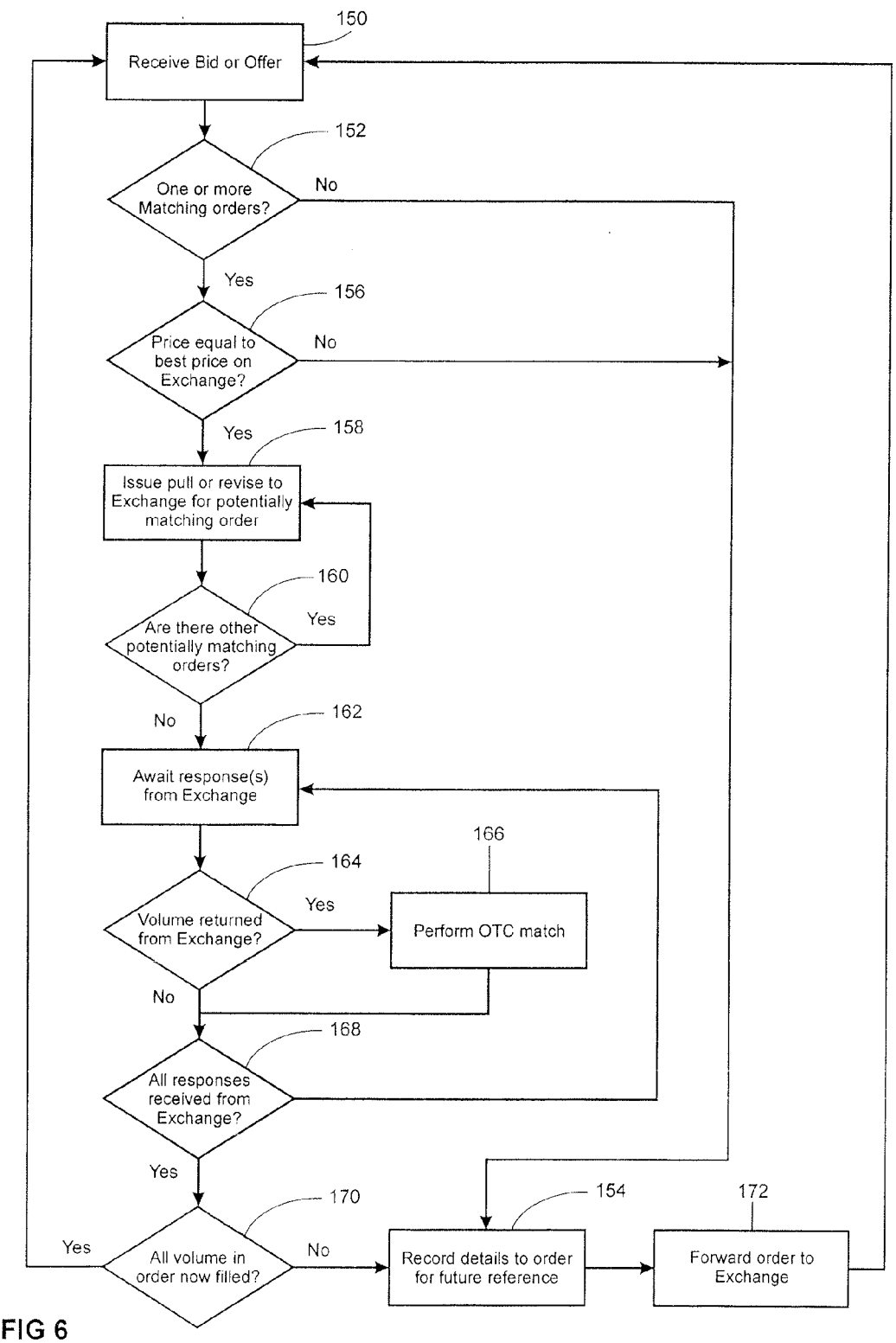
FIG. 6 is a software flow diagram illustrating the process flow for the electronic trading system in accordance with the present invention for the embodiment illustrated in FIGS. 4A and 4B
Figure 7:
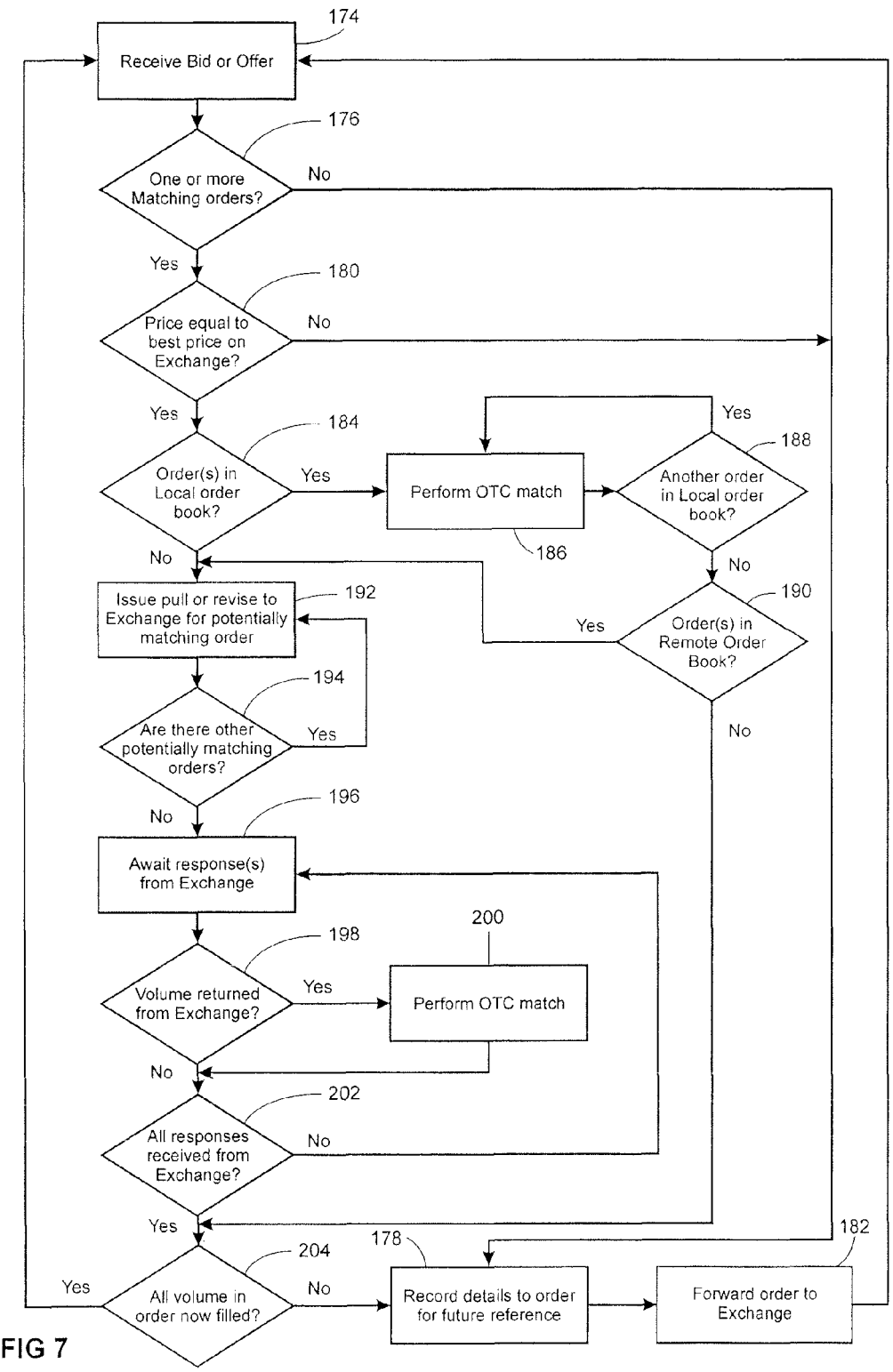
FIG. 7 is a software flow diagram illustrating the process flow for the electronic trading system in accordance with the present invention for the embodiment illustrated in FIGS. 5A and B
Figure 8:
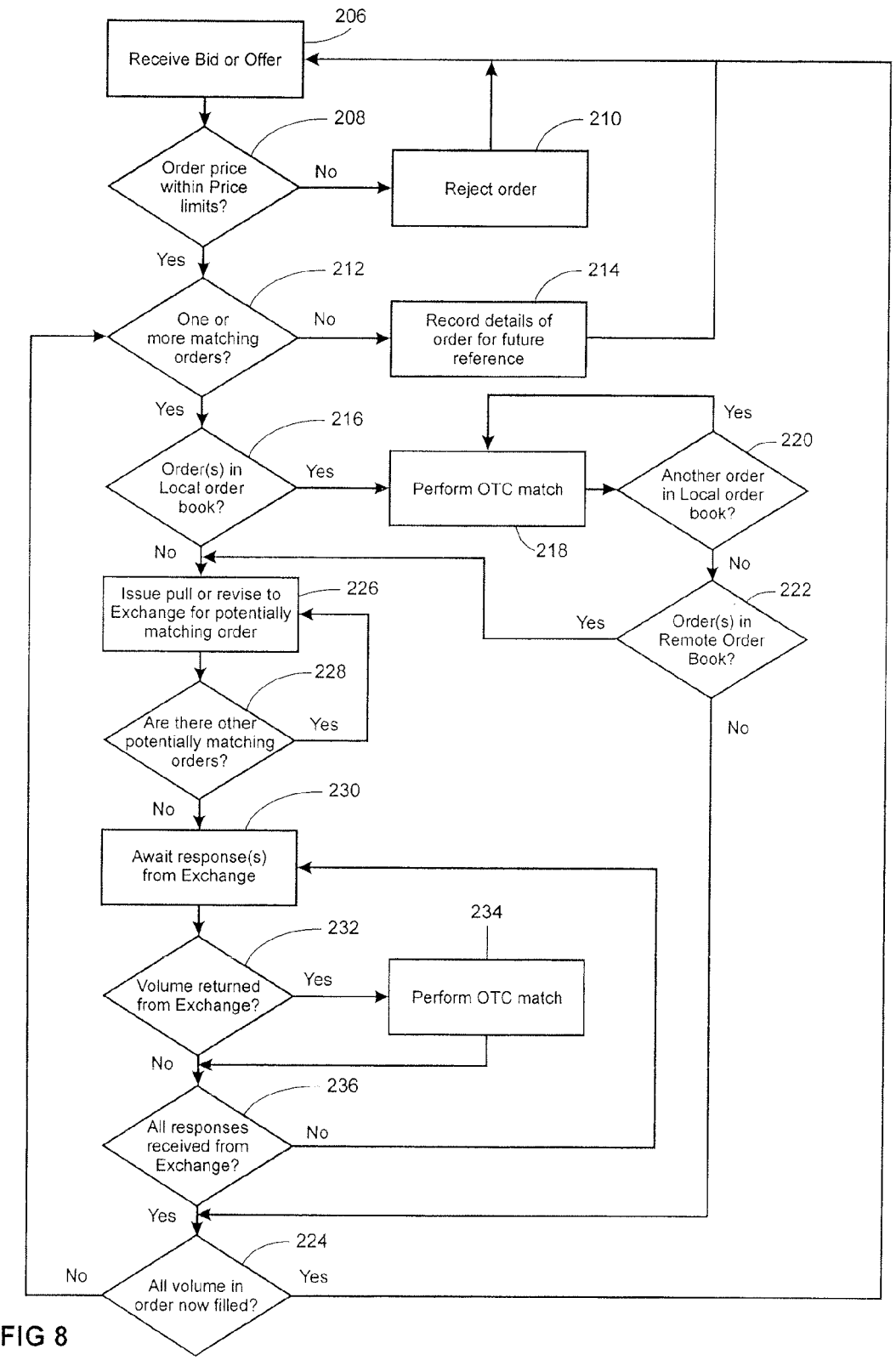
FIG. 8 is similar to FIG. 7 but for "only" orders within certain price limits.

The flow charts illustrated in FIGS. 6-8 are exemplary and illustrate an embodiment of the back office software described herein. In particular, FIG. 6 is an exemplary flow chart which illustrates order matching for an electronic trading system as illustrated in FIGS. 4A and 4B which does not include a local order book. Initially, in step 150, the system receives bid or sell orders. After each order is received, the matching engine 70 checks the exchange to determine if there are any matching orders in step 152. If not, the details of the order are recorded in step 154 for future reference. If there are matching orders at the exchange, the system checks in step 152 whether the order price is equal to the best price on the exchange in step 156. If not, the system returns to step 154. If the order price is equal to the best price on the exchange 104, a pull or revise order is issued to the exchange in step 158. The system then checks the exchange in step 160 to see if there are other any other potentially matching offers. If so, the system returns to step 158. If not, the system awaits responses from the exchange on the pull requests in step 162. In step 164, the system checks whether the volume from the exchange has been returned. If so, the trade is made over the counter in step 166. If not, the system checks in step 168 whether all responses have been received from the exchange. If not, the system loops back to step 162. If so, the system proceeds to step 170 and checks whether all volume in the order is filled. If so, the returns to step 150 and waits for orders. If not, the system proceeds to step 154 and records the details of the order. After the details of the order are recorded, the order is forwarded to the exchange in step 172. The system then returns to step 150 and awaits new orders.

FIGS. 7 and 8 are exemplary flow charts which illustrate order matching for an electronic trading system as illustrated in FIGS. 5A and 5B which includes a local order book. FIG. 7 illustrates the order processing in accordance with the present invention for orders in which no price limits have been set. In general, 'preferred' orders are constrained in their trading by the exchange prices while OTC 'only' orders are constrained by the price limits FIG. 8 is similar but for "only" orders in which price limits have been set for orders. Referring first to FIG. 7, the system awaits orders in step 174. Once an order is received, the system proceeds to step 176 and checks for matching orders that have been received and are unfilled. If there are no matching orders, the system records the details of the order in step 178. If there are matching orders, the system checks whether the matching order price is equal to the best price on the exchange in step 180. In order to provide the best fill price, if the matching order price is not equal to the best price on the exchange, the system returns to step 178 and forwards the order to the exchange in step 182. On the other hand, if the matching order price is equal to the best price on the exchange, the system checks a local order book in step 184 for matching orders. If there are matching orders in the local order book, the system performs an over the counter (OTC) trade in step 186. After the trade is performed, the system checks in step 188, whether there is another order in the local order book that can be matched. If so, the system returns to step 186 and performs the trade. If not, the system checks orders in the exchange order book in step 190 for other possible OTC trades. If there are no matches, the system returns to step 204. If there are potential matches, the system proceeds to step 192 and issues a pull or revision command to the exchange. After trading with the local order book is completed, the system then proceeds to step 194 and checks for other orders from the exchange order book for possible matches with local order book orders. The system then waits for responses from the exchange in step 196. As the responses from the exchange are received, the system checks whether the volume returned from the exchange is sufficient to match the outstanding order in step 198. If so, the system performs an OTC trade in step 200 and proceeds to step 202 and checks whether all responses from the exchange have been received. The system loops between steps 196 and 202 until all responses from the exchange have been received. Once all of the responses have been received from the exchange, the system checks in step 204 whether all of the volume in the order is filled. If so, the system loops back to step 174. If not, the system proceeds to steps 178 and records the details of the order that was not filled and forwards the order to the exchange in step 182.

As mentioned above, FIG. 8 illustrates the order processing in accordance with the present invention for incoming "only" orders in which price limits have been set by an authorized user. Referring to FIG. 8, after an order is received in step 206, the system checks in step 208 whether the order price is within the set price limits. If not, the order is rejected in step 210 and the system returns to step 206. In this embodiment, since the price limits have been set, the system does not provide the best fill price of the order by comparing local prices with exchange prices. Rather, if the order price is within limits, the system proceeds to step 212 and checks for matching orders. If there are no matching orders, the details of the order are recorded in step 214 for future reference, after which, the system loops back to step 206 and awaits new orders. If there are matching orders as determined in step 212, the system checks orders in its local order book in step 216. If there are matching orders in the local order book, an OTC trade is performed in step 218. After the OTC trade is performed, the system checks in step 220 whether other orders in the local order book can be matched. If so, the system loops back to step 218 and performs the trades. If there are no orders in the local order book that can be matched, the system checks the exchange order book in step 222 for matching orders. If there are no matching orders in the exchange order book, the system proceeds to step 224 and checks whether all volume in an order has been filled. If there are potentially matching orders in the exchange order book, the system proceeds to step 226 and issues pull or revision orders to the exchange. After the pull and revision orders are issued to the exchange, the system checks in step 228 for other potentially matching orders at the exchange. If so, the system loops back to step 226 and issues an additional pull or revision order to the exchange. After the pull and revision orders have been issued to the exchange, the system awaits responses from the exchange in step 230. Next in step 232, the checks the volume returned from the exchange. If the volume returned from the exchange is sufficient to fill a complete order, an OTC trade is performed in step 234 and the system proceeds to step 236 to check whether all responses have been received from the exchange. If the volume from the exchange is insufficient to fill a complete, the system proceeds to step 236 and checks whether all responses have been received. The system loops back to step 230 until all responses have been received from the exchange. Once all of the responses have been received from the exchange, the system proceeds to step 224 and checks whether all of the volume in the order has been filled. If so, the system loops back to step 206 and awaits new orders. If not, the system returns to step 212.

Figure 9:
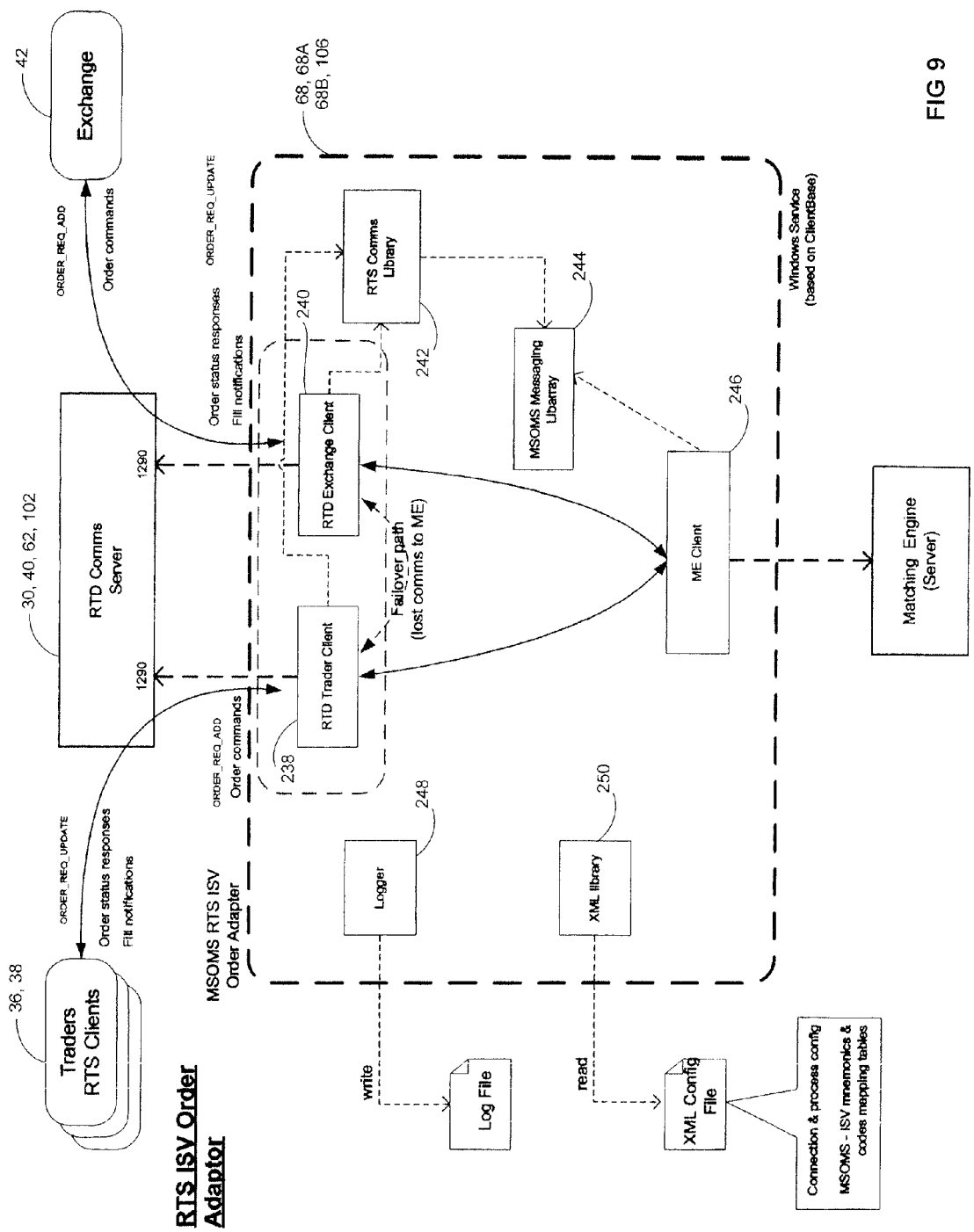
FIG. 9 is an exemplary block diagram of an order adapter for use with the present invention.

FIG. 9 illustrates an exemplary block diagram for the order adapter 68, 68A, 68B and 106 (FIGS. 4A, 4B, 5a and 5B, respectively). The order adapter 68, 68A, 68B and 106 acts as an interface between the RTD Server 30, 40, 62 and 102; the exchange 42 and the electronic trading system in accordance with the present invention Its primary function is a that of a message translator which translates the message protocol of the server 62 (FIGS. 4A and 4B), 102 (FIGS. 5A and 5B) and the electronic trading system. The order adapter 68, 68A, 68B and 106 also translates the message protocol between the exchange 42 and the electronic trading system. Such message translators, also known as protocol converters, are well known in the art, for example, as disclosed in U.S. Pat. No. 6,278,982 and International Patent Application No, PCT/US2004/037229, published as International Publication No. WO 2005/048063 A2 on May 26, 2005, hereby incorporated by reference.

The order adapter 68, 68A, 68B and 106 may include various exemplary software modules, such as an RTD Trader Client 238, an RTD Exchange Client 240, an RTS Comms Library, an MSOMS Messaging Library 244, an ME Client 246, a Logger 248 and an XML Library 250. The basic functions of the exemplary modules are described below. The RTD Comms Server is also described below.

RTD Comms Server—This server 30, 40, 62 and 102 includes software which facilitates trading activity between traders and exchanges and allows the electronic trading system to interact with the flow of orders between traders and the exchanges. Various commercially available servers are available for this function, such as the RTD system discussed above or other servers developed by independent software developers as independent software versions (ISV).

RTD Trader Client—This module 238 handles communication between the electronic trading system and traders 36, 38 using the server 30, 40, 62 and 102.

RTD Exchange Client—This module 240 handles communication between the electronic trading system and provides the RTD Comms server link to the exchanges 42.

ME Client—This module 246 handles communications with the matching engine 46, 70,110.

Messaging Library—This library 244 is configured as a collection of routines used to create and interpret messages sent and received between the system components.

RTS Comms Library—This library 242 is a collection of routines used to create and interpret messages sent between the electronic trading system and the RTD server 30,40,62 and 102.

XML Library—This library 250 is a collection of routines used to read configuration information on startup.

Logger—This library 248 may be used to output information to a local text file for later analysis.

Obviously, many modifications and variations of the present invention are possible in light of the above teachings. Thus, it is to be understood that, within the scope of the appended claims, the invention may be practiced otherwise than as specifically described above.

We claim:

1. A computerized method for handling orders for an asset, the method comprising the steps of:
   checking whether an order received from an order handling system for an asset is within predetermined price limits, and rejecting the received order if it is not within the predetermined price limits, otherwise, performing the following steps:
   a computerized matching engine determining whether the received order matches any previous contra-side order that the order handling system had previously sent to an electronic exchange;
   if the determining determines that there is no matching previous contra-side order, sending the received order to the electronic exchange; and
   if the determining determines that there is a matching previous contra-side order, the matching engine generating an instruction to the electronic exchange to revise the previous contra-side order sent to the electronic exchange and the matching engine performing a non-exchange based trade based on the order received from the order handling system and the matching previous contra-side order.

2. The method as recited in claim 1, wherein said asset is a futures contract or an options contract.

3. The method as recited in claim 1, further including the step of said received order being filled according to predetermined constraints.

4. The method as recited in claim 3, further including the step of said received order being filled as an over the counter only order or as a preferred order that can be filled either over the counter or on the exchange.

5. The method as recited in claim 4, wherein said step of said received order being filled as over the counter only order or as a preferred order that can be filled either over the counter or on the exchange results in the preferred order being filled at a best price.

6. The method as recited in claim 5, further including the step of checking the exchange for a price of a matching order to the received order on the exchange.

7. The method as recited in claim 6, further comprising filling the received order at a price equal to the price of the matching order on the exchange.

8. The method as recited in claim 7, further including the step of: sending a received order that can not be filled as an over the counter order to the exchange.

9. The method as recited in claim 8, further including the step of keeping track of an order book on the exchange.

10. The method as recited in claim 9, further including the step of checking the order book on the exchange and retrieving orders from the exchange on the exchange order book that can be matched with the received order to enable an over the counter trade.

11. The method as recited in claim 9, further including the step of maintaining a local order book, separate from said order book on said exchange.

12. An order handling system for handling orders for an asset, the system being configured to check whether a received order is within predetermined rice limits and rejecting the order if it is not within the predetermined price limits, and the system comprising:
   one or more computers of a matching engine being arranged to determine whether a non-rejected received order matches any previous contra-side order that the system had previously sent to an electronic exchange;
   wherein, if it is determined that there is no matching previous contra-side order the system sends the non-rejected received order to the electronic exchange; and
   wherein, if it is determined that there is a matching previous contra-side order, the matching engine (a) generates an instruction to the electronic exchange to revise the matching previous contra-side order sent to the electronic exchange and (b) performs a non-exchange based trade based on the non-rejected received order and the matching previous contra-side order.

13. The system as recited in claim 12, wherein said asset is a futures contract or an options contract.

14. An electronic trading system, comprising:
   an order handling system for handling orders for an asset, the order handling system being configured to check whether a received order is within predetermined price limits and rejecting the order if it is not within the predetermined price limits,
   the order handling system comprising:
      one or more order input devices structured to receive an order for an asset; and
      a matching engine that matches non-rejected orders received by the one or more order input devices,
      the matching engine being arranged to determine whether a non-rejected order matches any previous contra-side order that the, order handling system had previously sent to an electronic exchange;
      wherein, if it is determined that there is no matching previous contra-side order, the order handling system sends the non-rejected received order to the electronic exchange; and
      wherein, if it is determined that there is a matching the a previous contra-side order, the matching engine (a) generates an instruction to the electronic exchange to revise the matching previous contra-side order sent to the electronic exchange and (b) performs a non-exchange based trade based on the non-rejected received order and the matching previous contra-side order.

15. The electronic trading system as recited in claim 14, wherein said electronic trading system is configured such that said received order may be filled as either an over the counter only order or a preferred order which can be filled either over the counter or on the exchange.

16. The electronic trading system as recited in claim 15, wherein said electronic trading system is configured so that said preferred order is filled at a best price.

17. The electronic trading system as recited in claim 15, wherein said electronic trading system is configured to keep track of an order book on the electronic exchange.

18. The electronic trading system as recited in claim 16, wherein said electronic trading system is configured to retrieve orders from the exchange for over the counter trades.

19. The electronic trading system as recited in claim 17, wherein said electronic trading system is configured to maintain a local order book separate from said order book on said exchange.

20. A tangible computer readable medium that stores a computer program that, when executed by a computerized matching engine that matches orders submitted to an order handling system for handling orders for an asset, causes the computerized matching engine to perform the steps of:

checking whether an order received from an order handling system for an asset is within predetermined price limits, and rejecting the received order if it is not within the predetermined price limits, otherwise, performing the following steps:

determining whether the received order matches any previous contra-side order that the order handling system had previously sent to an electronic exchange;

if the determining determines that there is no matching previous contra-side order, sending the received order to the electronic exchange; and if the determining determines that there is a matching previous contra-side order, the computerized matching engine generating an instruction to the electronic exchange to revise the previous contra-side order sent to the electronic exchange and the computerized matching engine performing a non-exchange based trade based on the received order and the matching previous contra-side order.

\* \* \* \* \*